United States Patent
Ezrielev et al.

(10) Patent No.: US 12,422,997 B2
(45) Date of Patent: Sep. 23, 2025

(54) RE-ALLOCATION OF DISKS BASED ON DISK HEALTH PRIOR TO RESTORE

(71) Applicant: Dell Products L.P., Round Rock, TX (US)

(72) Inventors: Ofir Ezrielev, Be'er Sheba (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/046,659

(22) Filed: Oct. 14, 2022

(65) Prior Publication Data

US 2024/0126445 A1 Apr. 18, 2024

(51) Int. Cl.
*G06F 3/06* (2006.01)

(52) U.S. Cl.
CPC .......... *G06F 3/0614* (2013.01); *G06F 3/0631* (2013.01); *G06F 3/0653* (2013.01); *G06F 3/0683* (2013.01)

(58) Field of Classification Search
CPC .... G06F 3/0614; G06F 3/0631; G06F 3/0653; G06F 3/0683
See application file for complete search history.

(56) References Cited

U.S. PATENT DOCUMENTS

| | | | |
|---|---|---|---|
| 9,250,823 B1* | 2/2016 | Kamat | G06F 3/0607 |
| 10,082,965 B1* | 9/2018 | Tamilarasan | G06F 12/00 |
| 10,146,459 B1 | 12/2018 | Gao et al. | |
| 11,262,918 B1 | 3/2022 | Venugopal et al. | |
| 2009/0144568 A1 | 6/2009 | Fung | |
| 2014/0095826 A1* | 4/2014 | Rajagopal | G06F 3/067 |
| | | | 711/170 |
| 2014/0317444 A1* | 10/2014 | Kushihara | G06F 3/0647 |
| | | | 714/6.22 |
| 2017/0285943 A1 | 10/2017 | Dalmatov | |
| 2020/0133753 A1* | 4/2020 | Olson | G06F 11/0781 |
| 2020/0133801 A1 | 4/2020 | Srinivasan et al. | |
| 2021/0149777 A1* | 5/2021 | Gao | G06F 11/079 |
| 2021/0286535 A1 | 9/2021 | Aldred et al. | |
| 2021/0334030 A1 | 10/2021 | Yang et al. | |
| 2023/0008978 A1 | 1/2023 | Puvvada et al. | |

* cited by examiner

*Primary Examiner* — Nanci N Wong
(74) *Attorney, Agent, or Firm* — Workman Nydegger

(57) ABSTRACT

Disk drive reallocation or replacement is disclosed. When performing a data protection operation, a health score is determined for each of the disk drives associated with the data protection operation. Replacement is recommended for each of the disk drives with an unfavorable health score. The recommendation may also identify a drive class based in part on the write or wear pattern. This allows unhealthy drives to be replaced prior to performing the data protection operation.

20 Claims, 5 Drawing Sheets

RE-ALLOCATION OF DISKS BASED ON DISK HEALTH PRIOR TO RESTORE

FIELD OF THE INVENTION

Embodiments of the present invention generally relate to data protection systems and operations. More particularly, at least some embodiments of the invention relate to systems, hardware, software, computer-readable media, and methods for reallocating or replacing disks.

BACKGROUND

Data can become corrupted for multiple reasons. Data can be corrupted, for example, due to malicious reasons such as cyber-attacks. Data may also become corrupted for non-malicious reasons. Drive failures or other technical issues may result in corrupted or lost data.

This problem is partially addressed by creating backups of data. Backups allow production data to be restored in the event of corruption of loss. Backups, however, may be insufficient to fully protect the data. More specifically, backups protect the data, but do not specifically address the health of the storage system itself or the health of the disk drives.

For example, the life of a disk drive can often be described in terms of writes. Once a disk drive has been written to a certain number of times or once a certain amount of data has been written to the disk drive, there may be a presumption that the disk drive may fail in the near future. In other words, the viability of the disk drive is in question.

When a storage system includes multiple disk drives, restoring data to the storage system presumes that data will be written to many of the disk drives. However, the restore operation may be restoring data to drives whose remaining lifetime is unknown. This may result in situations where data is restored recurrently and may lead to more significant data loss.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
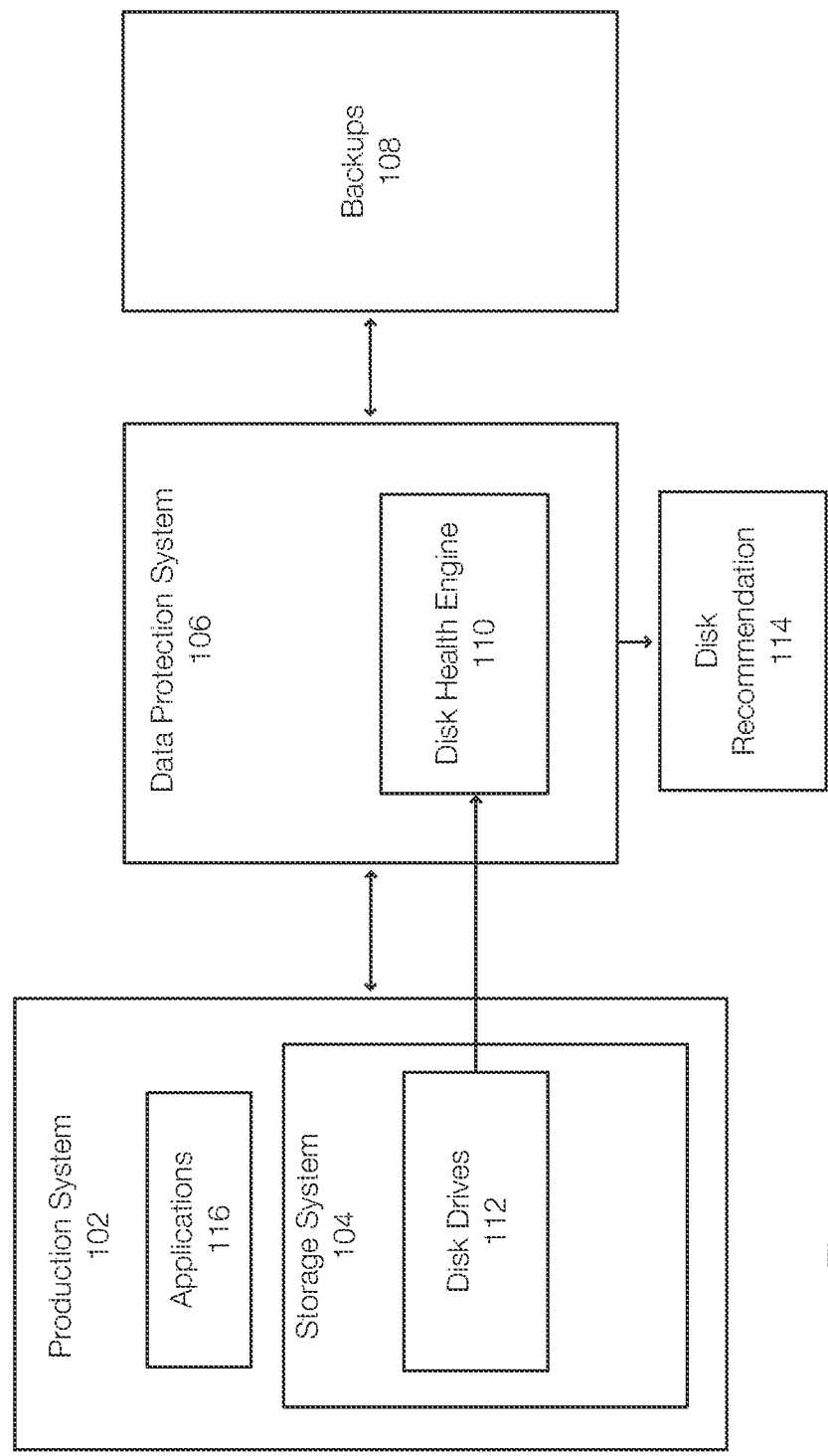
FIG. 1 discloses aspects of a data protection system that includes a disk health engine configured to generate drive replacement recommendations.

Embodiments of the present invention generally relate to data backup and restore processes. More particularly, at least some embodiments of the invention relate to systems, hardware, software, computer-readable media, and methods for recovery operations with disk drive reallocation or replacement.

Embodiments of the invention further relate to determining the health of disk drives that are the target of a restore operation and, when the health is suspect, embodiments of the invention may recommend that the disk be changed (e.g., replaced, upgraded) prior to restoring the data.

For example, when the target storage system is unhealthy, an organization may recover data into an unhealthy disk. This may lead to another failure in the near term. Embodiments of the invention include a dish health engine that is configured to assess the health of each disk drive of the target storage system and based on the health of each disk, recommend reallocation.

This improves the likelihood that the data will be restored correctly and improves the overall health of the target storage system. U.S. Pat. No. 10,216,558, incorporated by reference herein, relates to predicting failure of individual drives based using models that used samples of SMART (Self Monitoring, Analysis and Reporting Technology) data. More specifically, SMART attributes are incorporated by reference herein. Example SMART attributes include, but are not limited to, read error rate, throughput performance, spin-up time, reallocated sectors count, power-on hours, seek error rate, spin retry count, vibration during write, disk shift, and the like or combinations thereof.

The behavior history of a disk drive may be added as a drive history feature to drive features modeled on SMART data attributes. The drive behavior history feature is used in successive modeling of drive behavior history to increase accuracy in predicting an individual drive's failure over time.

Consecutive individual drive failure predictions are aggregated to further increase accuracy in predicting an individual drive's failure. In one embodiment, the system models drive behavior history and other drive features using a machine learning model. Individual drives classified as predicted to fail within a certain period of time are incorporated into a drive replacement strategy that may factor in a field-based replacement cost associated with the drive.

Embodiments of the invention use the probability of a disk to fail and convert the probability into a health score. Before restoring data into a drive, the drive SMART telemetry data is extracted, relevant features are calculated, and the model generates a health score.

A threshold score may be set and any drive whose health score is below the threshold score may be replaced prior to restoring the data to the drive. Embodiments of the invention integrate a disk drive failure prediction into a data protection engine to avoid recurrent failures. In addition, metadata about the volume being recovered, such as the writing pattern, may be used to recommend not only a drive replacement but also a drive class of the replacement drive. Disk drives subject to heavier write patterns may be replaced with the appropriate class of drive that is better able to withstand the number of writes.

FIG. 1 discloses aspects of a data protection system configured to perform data protection operations including proactive maintenance operations. A data protection system 108 is configured to perform data protection operations on the production system 102. This may include, among others, backup operations, replication operations, restore operations, and/or deduplication operations. The production system 102 may be an on-premise system, a cloud-based system, an edge-based system, or combination thereof. The production system may include a storage system 104 that includes disk drives 112 or other storage devices. Data of applications 116 of the production system 102 may be stored on the storage system 104.

When performing data protection operations, the data protection operations may be performed in different manners. For example, applications may be backed up. The individual disk drives 112 can be protected. Applications, which may have volumes that correspond to one or more the disk drives 112, may be protected such that the relevant sets of disk drives are protected together. This ensures that the backup and any restore operations are consistent.

The data protection system 106 may generate backups 108. Backups 108 may represent snapshots, full backups, synthesized full backups, incremental backups, replicas, copies, point-in-time backups, journals, or the like or combinations thereof.

The data protection system 106 may include a disk health engine 110. The disk health engine 110 is configured to generate a probability of drive failure for each of the disk drives 112. The disk health engine 110 may be configured to, based on the probabilities of drive failure, generate a disk recommendation 114. The disk recommendation may identify disks that should be replaced prior to a restore or other data protection operation.

For example, a disk recommendation may be generated prior to a backup operation. This may advantageously ensure that the backup operation will be completed successfully. Similarly, a disk recommendation may be generated prior to a restore operation. This may advantageously ensure that the restore operation is completed successfully.

Because a backup operation may involve more reads than writes and a restore operation may involve more writes than reads, the corresponding thresholds for replacement may be different. In one example, the disk health engine 110 may also be configured to generate a probability of failure that is based, in part, on the operations to be performed.

Figure 2:
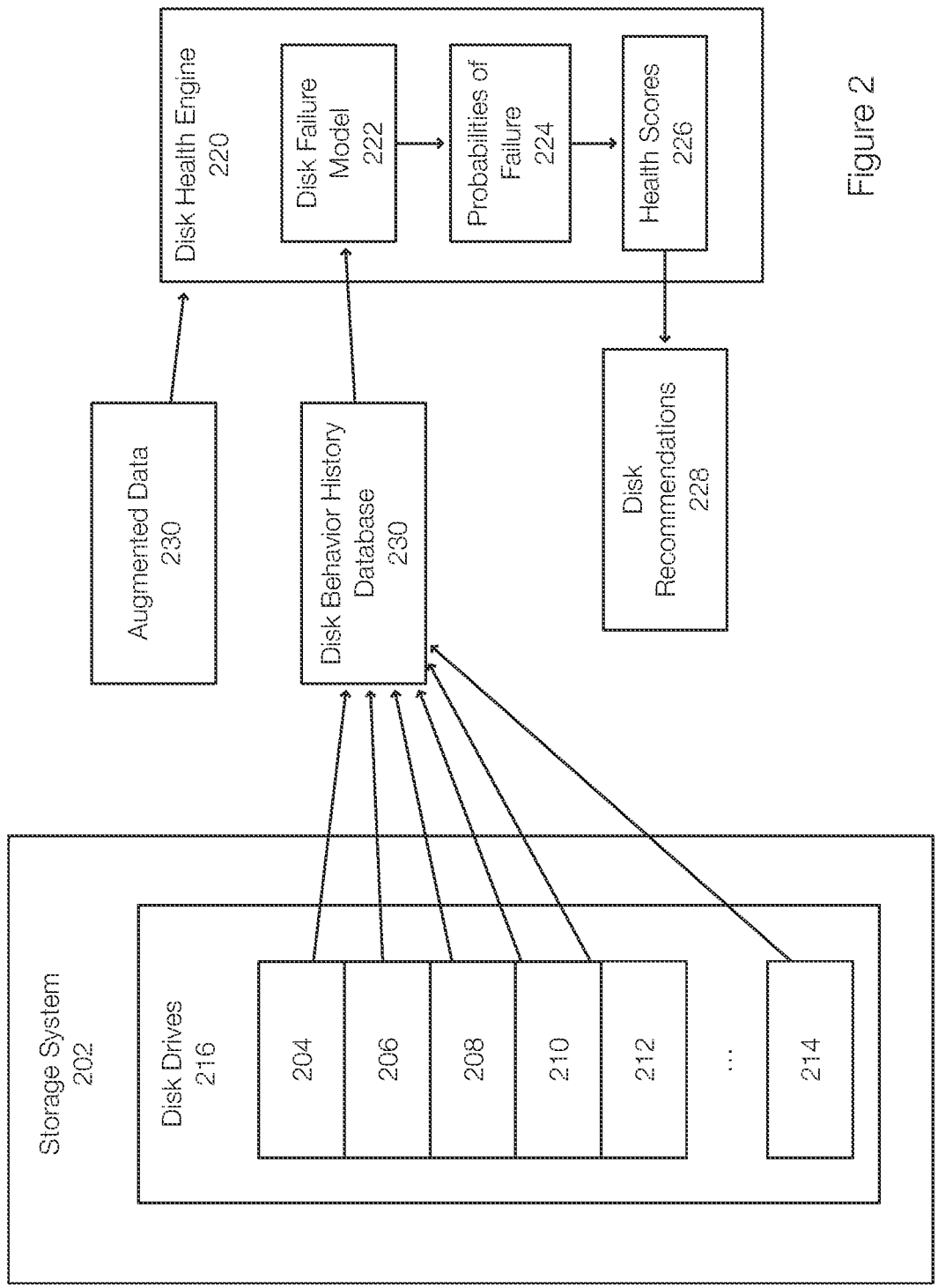
FIG. 2 discloses aspects of health scores generated by the disk health engine and making drive replacement recommendations.

FIG. 2 discloses aspects of a disk health engine configured to generate disk replacement recommendations. FIG. 2 illustrates a storage system 202 that includes disk drives 216, represented as disk drives 204, 206, 208, 210, 212, and 214. The disk drives 216 may be magnetic based hard disk drives, flash memory or solid-state disk drives, or the like.

In this example, disk attributes (e.g., SMART attributes or subset thereof) are retrieved from the disk drives 216 and stored in a disk behavior history database 230. As the disk attributes are collected over time, the disk behavior history database 230 includes a time series view of the attributes of the disk drives. The time series data allows the attributes to be compared with each other over time.

The disk health engine 220 includes a disk failure model 222 that may receive, as input, data from the disk behavior history database 230. For example, the input to the disk failure model 222 may include a number of sets of attributes for each of the disk drives. This number may be set automatically, by an administrator, or learned. Further, one of the sets may include a set that is retrieved from the disk drives 216 at the time of performing a data protection operation. Alternatively, the attributes may be retrieved from the disk drives may be directly input to the disk failure model 222. In one example, the features may be extracted from the attributes and input to the disk failure model 222. The features may also include information collected just prior to when the drives fail.

In one example, the disk failure model 222 may be trained using data that is also related or tied to actual failure. This may allow the inferences or predictions from the disk failure model 222 to infer time to failure, probability of failure within a certain time period, or the like.

The disk failure model 222 may generate probabilities of failure 224, which includes a probability of failure for each of the disk drives 216. In one example, the probabilities of failure constitute the health scores 226. In one example, the probabilities of failure 224 are converted to health scores 226. In one example, the health score may be expected or predicted time to failure or probability of failure within a certain time frame.

The health scores 226 output by the disk failure model 222 can be used to make the disk recommendations 228. In one example, the disk recommendations 228 are associated with a health score. If the health scores 226 are configured such that disks with higher health scores 226 are likely to fail, then disk drives whose health score is above the threshold health score are recommended for replacement. If the health scores 226 are configured such that disk drives with lower health scores are likely to fail, then disk drives whose health score is below the threshold health score are recommended for replacement.

More specifically, when the health score is time to expected failure, a threshold health score may be a minimum acceptable time to failure. If the minimum acceptable time is 6 months, a health score below 6 months may result in a replacement recommendation. When the health score is expressed such that the drive is expected to fail with a given time period, the threshold health score may still be a minimum acceptable time to failure (or minimum life threshold). If the device is expected to fail in a time period that is less than the minimum life threshold, the health score may result in a replacement recommendation.

The disk recommendations 228 may also be informed with augmented data 230. The augmented data may include information related to wear patterns. The wear pattern may also be derived or determined from SMART attributes or be based on writes per day or terabytes written, for example.

The wear pattern, for example, may influence a class of disk drive for the replacement disk drive. For example, the writes to a disk drive may increase over time for various reasons. As a result, the wear pattern may indicate that a higher class of disk drive would be more suitable when selecting a replacement disk drive. This further allows the appropriate class of drive to be identified for a given application.

When replacing disk drives, for example, prior to a restore operation, the likelihood of a recurrent failure is reduced. This improves the total customer experience and improves serviceability.

Figure 3:
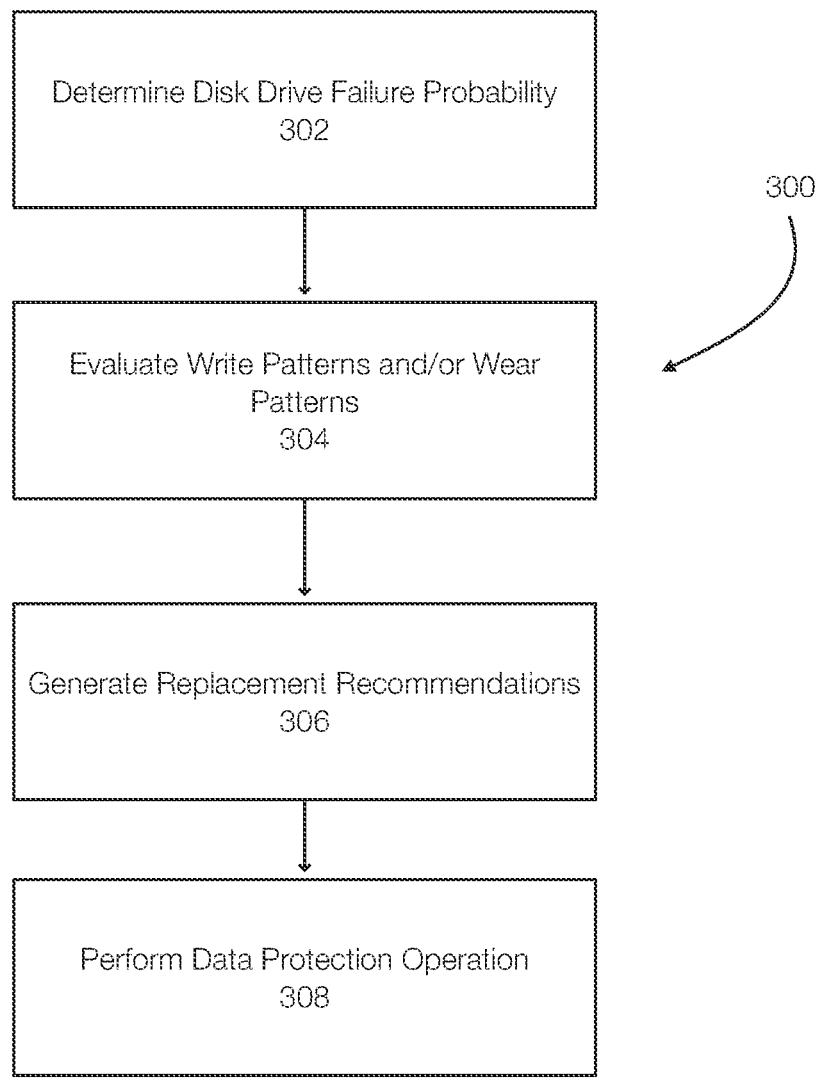
FIG. 3 discloses aspects of reallocating disk during a data protection operation and aspects drive replacement recommendations.

FIG. 3 discloses aspects of reallocating disks, which may include drive replacement recommendations. In the method 300, a disk drive failure probability is determined 302. This may be performed in the context of a data protection operation or in preparing for performing the data protection operation. For example, when initiating a restore operation, embodiments of the invention may evaluate the disk drives that are the target of the restore operation and recommend replacing unhealthy drives. This ensures that the recovery operation will not need to be performed again when the drive fails shortly after the restore operation.

Determining the failure probabilities of the disk drives may be performed by a disk health engine that includes a machine learning model configured to determine or predict whether a drive will fail. The model has been trained on historical drive data or features.

Optionally, in the method 300, write patterns or wear patterns may also be determined 304. If a drive needs to be replaced or when replacement is recommended, the write or wear patterns may aid in recommending a class of disk drive.

With the failure probabilities, which are health scores, or which may have been converted to health scores, drive replacement recommendations are generated 306. Generally, drives with health scores above or below the relevant threshold health score are recommended for replacement. The class of drive may be based on the write or wear patterns.

More generally, embodiments of the invention may restore to target disk drives whose health scores or failure probabilities satisfy the relevant threshold health score or threshold failure probability. This may require mappings of virtual drives to physical drives to be changed or reconfigured such that the data protection operation is performed to the target disk drives with an adequate health score.

In one embodiment, if may be necessary to replace the disk drives first. When the disk drives have been replaced (or the replacement operation was declined) the data protection operation is performed 308. In a restore operation, this causes the data being restored to be restored to the newly replaced disks (and other disks that may not have been replaced).

In another example, the target disk drives used during the restore operation are reallocated such that the target physical drives are sufficiently healthy drives (have a health score or failure probability that is adequate in view of the relevant threshold). The recommendations can then be accepted or declined. Accepting the recommendation allows the physical drives to be replaced.

Figure 4:
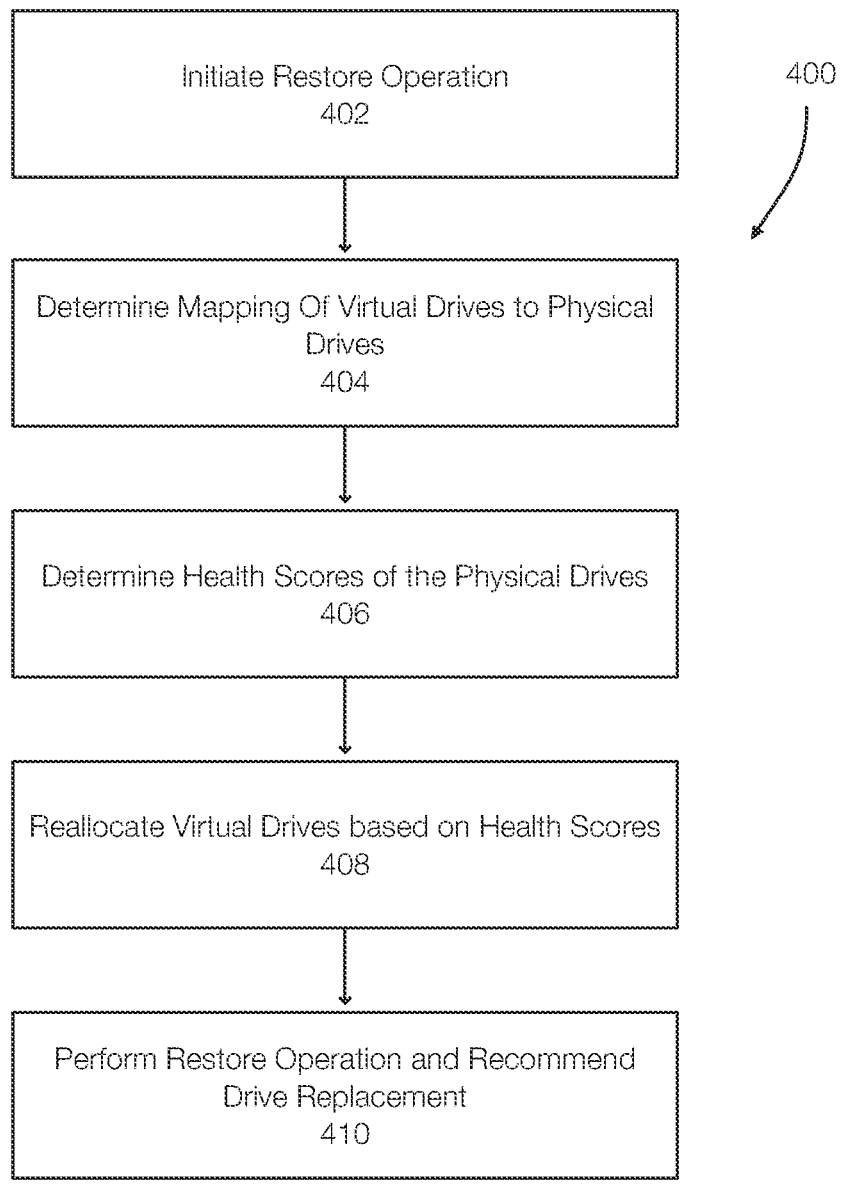
FIG. 4 discloses additional aspects of reallocating disks during a data protection operation.
Figure 5:
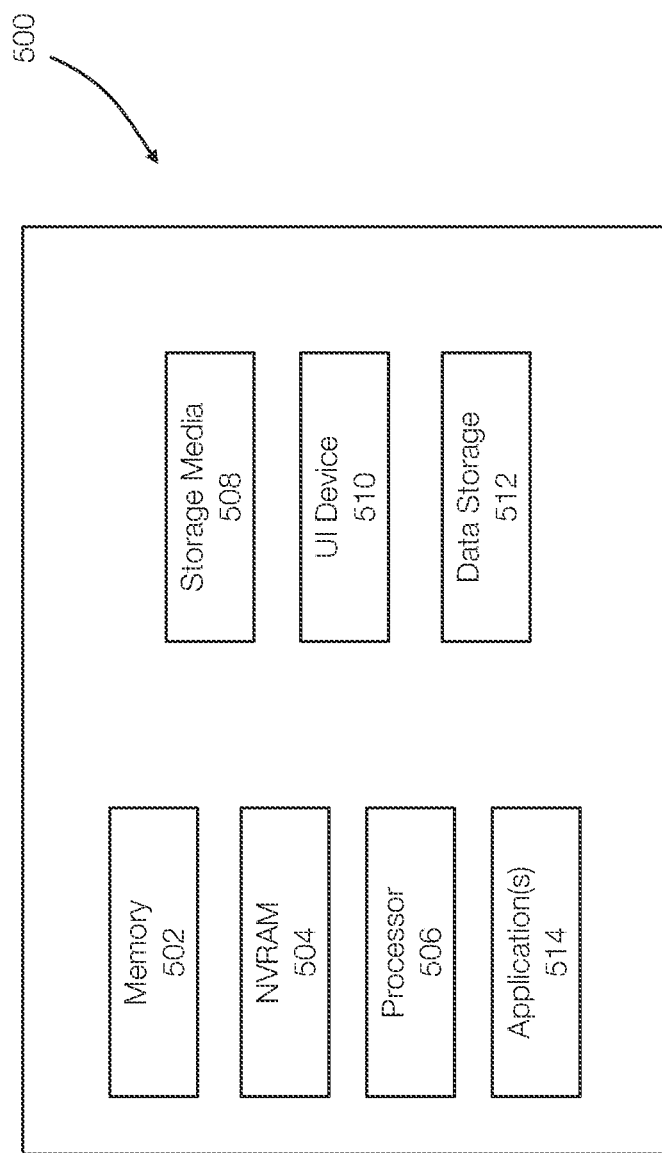
FIG. 5 discloses aspects of a computing device, system, or entity.

FIG. 4 discloses additional aspects of performing data protection operations and of reallocating disk drives. In one example, a restore operation may be restoring data to virtual drives. Embodiments of the invention allow the disks allocated to the virtual drives to be reallocated based on health scores of the physical disk drives.

The method 400 may begin by initiating 402 a restore operation. Prior to actually restoring the data to the virtual drives, the mapping of virtual drives to physical drives 404 is determined 404 or accessed. A health score of the physical drives associated with the virtual drives is determined 406 as described herein. In one example, health scores of all physical disk drives are determined at least because of the possibility of reallocating physical disk drives.

Based on the health scores of the physical disk drives, the method 400 reallocates 408 the physical drives assigned to the virtual drives of the application being restored. This ensures that the restore operation writes to physical disks that are not likely to fail, at least in the near term or compared to other physical drives. In one example, this may include changing a mapping of the virtual-physical drives such that the virtual drives are mapped to healthy physical disk drives.

Next, the restore operation is performed 410. Recommendations may also be made to replace the physical drives that were deemed unhealthy and likely to fail based on their health scores. The method 400 allows the restore operation to performed without delay while also allowing an administrator to be proactive in maintaining the health of the physical disk drives. Because the unhealthy disk drives are not associated with any virtual drives in this example, the unhealthy disk drives can be replaced with a drive of an appropriate class.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented. The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machine, containers, or virtual machines (VM), though no particular component implementation is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising A method comprising: initiating a data protection operation associated with disk drives of a storage system, determining a failure probability for each of the disk drives of a storage system that is associated with the data protection operation using a failure prediction model, generating a drive replacement recommendation for each of the disk drives based on the failure probability, performing the data protection operation to disk drives whose failure probability satisfies a threshold failure probability, wherein disk drives that do not satisfy the threshold failure probability are recommended for replacement.

Embodiment 2. The method of embodiment 1, wherein the data protection operation comprises a restore operation configured to restore data to the disk drive.

Embodiment 3. The method of embodiment 1 and/or 2, further comprising retrieving attributes of each of the disk drives.

Embodiment 4. The method of embodiment 1, 2, and/or 3, further comprising training the failure prediction model using historical attributes collected from the disk drives.

Embodiment 5. The method of embodiment 1, 2, 3, and/or 4, further comprising replacing the disk drives recommended for replacement with new disk drives.

Embodiment 6. The method of embodiment 1, 2, 3, 4, and/or 5, further comprising determining a class of the new disk drives based at least one a write pattern associated with the disk drives.

Embodiment 7. The method of embodiment 1, 2, 3, 4, 5, and/or 6, further comprising generating a health score for each of the disk drives based on corresponding failure probabilities and recommending replacement of the disk drives whose health scores to not satisfy a threshold health score.

Embodiment 8. The method of embodiment 1, 2, 3, 4, 5, 6, and/or 7, further comprising reallocating disk drives for the data protection operation such that target disk drives used by the data protection operation only include disk drives with a sufficient health score.

Embodiment 9. The method of embodiment 1, 2, 3, 4, 5, 6, 7, and/or 8, comprising changing a mapping of virtual drives to physical drives such that the virtual drives are mapped to the target drives when the data protection operation is restoring data to the virtual drives.

Embodiment 10. The method of embodiment 1, 2, 3, 4, 5, 6, 7, 8, and/or 9, wherein the health score is an expected time to failure or a time during which drive failure is expected.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, agent, or engine may refer to software objects or routines that execute on the computing system. The different components, modules, engines, agents and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 4, any one or more of the entities disclosed, or implied, by the Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   initiating a data protection operation associated with target disk drives of a storage system that includes a set of disk drives, the target disk drives included in the set of disk drives;
   determining a failure probability for each of the disk drives of the storage system that is associated with the data protection operation using a failure prediction model;
   generating a drive replacement recommendation for each of the disk drives based on the failure probability and a write pattern prior to the data protection operation, wherein the drive replacement recommendation includes a drive class associated with each of the disk drives, wherein the failure probability score represents a health score, wherein the drive class is based on the write pattern;

replacing the disk drives recommended for replacement, wherein drive classes of the replaced disk drives are selected to handle the write patterns;

reallocating disk drives of the storage system for the data protection operation such that new target disk drives used by the data protection operation only include disk drives from the set of disk drives with a sufficient health score;

changing a mapping of virtual drives of the data protection operation such that the virtual drives are mapped to the new target disk drives; and performing the data protection operation to the new target disk drives whose failure probability satisfies a threshold failure probability.

2. The method of claim 1, wherein the data protection operation comprises a restore operation configured to restore data to the new target disk drives, wherein the drive replacement recommendation when the data protection operation is a restore operation differs from the drive replacement recommendation when the data protection operation is a backup operation.

3. The method of claim 1, further comprising retrieving attributes of each of the disk drives of the storage system.

4. The method of claim 3, further comprising training the failure prediction model using historical attributes collected from the disk drives.

5. The method of claim 1, further comprising replacing the disk drives recommended for replacement with new disk drives.

6. The method of claim 5, wherein the drive class is based at least on a write pattern associated with the disk drives.

7. The method of claim 1, further comprising generating a health score for each of the disk drives based on corresponding failure probabilities and recommending replacement of the disk drives whose health scores to not satisfy a threshold health score.

8. The method of claim 1, wherein the data protection operation comprises a backup operation or a restore operation.

9. The method of claim 8, wherein the data protection operation is performed after the drive replacement recommendation is made, reallocation of the disk drives is performed, and the changing of the mapping of virtual drives to physical drives is performed.

10. The method of claim 1, wherein the health score is an expected time to failure or a time during which drive failure is expected.

11. A non-transitory storage medium having stored therein instructions that are executable by one or more hardware processors to perform operations comprising:

initiating a data protection operation associated with target disk drives of a storage system that includes a set of disk drives, the target disk drives included in the set of disk drives;

determining a failure probability for each of the disk drives of the storage system that is associated with the data protection operation using a failure prediction model;

generating a drive replacement recommendation for each of the disk drives based on the failure probability and a write pattern prior to the data protection operation, wherein the drive replacement recommendation includes a drive class associated with each of the disk drives, wherein the failure probability score represents a health score, wherein the drive class is based on the write pattern;

replacing the disk drives recommended for replacement, wherein drive classes of the replaced disk drives are selected to handle the write patterns;

reallocating disk drives of the storage system for the data protection operation such that new target disk drives used by the data protection operation only include disk drives from the set of disk drives with a sufficient health score;

changing a mapping of virtual drives of the data protection operation such that the virtual drives are mapped to the new target disk drives; and performing the data protection operation to the new target disk drives whose failure probability satisfies a threshold failure probability.

12. The non-transitory storage medium of claim 11, wherein the data protection operation comprises a restore operation configured to restore data to the new target disk drives, wherein the drive replacement recommendation when the data protection operation is a restore operation differs from the drive replacement recommendation when the data protection operation is a backup operation.

13. The non-transitory storage medium of claim 11, further comprising retrieving attributes of each of the disk drives.

14. The non-transitory storage medium of claim 13, further comprising training the failure prediction model using historical attributes collected from the disk drives.

15. The non-transitory storage medium of claim 11, further comprising replacing the disk drives recommended for replacement with new disk drives.

16. The non-transitory storage medium of claim 15, wherein the drive class is based at least on a write pattern associated with the disk drives.

17. The non-transitory storage medium of claim 11, further comprising generating a health score for each of the disk drives based on corresponding failure probabilities and recommending replacement of the disk drives whose health scores to not satisfy a threshold health score.

18. The non-transitory storage medium of claim 11, wherein the data protection operation comprises a backup operation or a restore operation.

19. The non-transitory storage medium of claim 18, wherein the data protection operation is performed after the drive replacement recommendation is made, reallocation of the disk drives is performed, and the changing of the mapping of virtual drives to physical drives is performed.

20. The non-transitory storage medium of claim 19, wherein the health score is an expected time to failure or a time during which drive failure is expected.

* * * * *